(12) United States Patent
Takahashi et al.

(10) Patent No.: US 7,386,174 B2
(45) Date of Patent: Jun. 10, 2008

(54) IMAGE TRANSMISSION APPARATUS AND METHOD THEREFOR

(75) Inventors: Kazuhiro Takahashi, Tokorozawa (JP); Hideyuki Arai, Kawasaki (JP); Masamine Maeda, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 426 days.

(21) Appl. No.: 10/645,672

(22) Filed: Aug. 22, 2003

(65) Prior Publication Data

US 2004/0036807 A1    Feb. 26, 2004

Related U.S. Application Data

(60) Continuation of application No. 09/985,238, filed on Nov. 2, 2001, now Pat. No. 6,654,498, which is a division of application No. 08/909,062, filed on Aug. 14, 1997, now Pat. No. 6,337,928.

(30) Foreign Application Priority Data

Aug. 26, 1996  (JP)  .................................. 8-223373
Aug. 27, 1996  (JP)  .................................. 8-224914
Nov. 1, 1996   (JP)  .................................. 8-291716

(51) Int. Cl.
    *G06K 9/36* (2006.01)
(52) U.S. Cl. ..................................................... 382/232
(58) Field of Classification Search ......... 382/232–251, 382/298–300, 116; 348/14.01–14.16, 154, 348/426.02, 420.1, 224.1, 556, 207.99; 715/720, 715/728; 386/112–129, 68; 358/426.02, 358/1.15; 375/240.01–240.26
See application file for complete search history.

(56) References Cited

U.S. PATENT DOCUMENTS 5,357,281 A    10/1994    Ikeda et al. ............ 375/240.12

(Continued)

FOREIGN PATENT DOCUMENTS

EP    0 619 678 A2 *    10/1994

(Continued)

OTHER PUBLICATIONS

Apr. 26, 2005 Japanese Official Action in Japanese Patent Application No. 8-224914 (Notification of Reasons for Refusal).

(Continued)

*Primary Examiner*—Ishrat Sherali
(74) *Attorney, Agent, or Firm*—Fitzpatrick, Cella, Harper & Scinto

(57) ABSTRACT

An image capture apparatus includes an image capture unit, a mode setting unit, a control unit, a wireless transmitting unit and a display unit. The image capture unit captures images. The mode setting unit is adapted to set one of a plurality of image capture modes in accordance with a selection by a user before the image capture unit captures the images. The control unit determines, according to the image capture mode set by the mode setting unit, three parameters to be applied to the captured images, the three parameters including a frame rate, the number of pixels, and a compression ratio. The wireless transmitting unit transmits the captured images by wireless after the three parameters determined by the control unit are applied to the captured images. The display unit displays the three parameters determined by the control unit.

4 Claims, 13 Drawing Sheets

U.S. PATENT DOCUMENTS

| | | | | |
|---|---|---|---|---|
| 5,426,513 | A | * | 6/1995 | Scorse et al. ............ 358/426.02 |
| 5,467,403 | A | | 11/1995 | Fishbine et al. .............. 382/116 |
| 5,488,414 | A | | 1/1996 | Hirasawa et al. ....... 348/207.99 |
| 5,625,410 | A | * | 4/1997 | Washino et al. ............. 348/154 |
| 5,675,375 | A | | 10/1997 | Rifee ......................... 348/14.1 |
| 5,677,727 | A | | 10/1997 | Gotoh et al. .............. 348/14.01 |
| 5,699,113 | A | | 12/1997 | Ohiwa ..................... 348/240.3 |
| 5,874,999 | A | | 2/1999 | Suzuki et al. ................ 348/556 |
| 5,953,484 | A | * | 9/1999 | Kojima ........................ 386/68 |
| 6,160,579 | A | | 12/2000 | Shiraiwa et al. .......... 348/224.1 |
| 6,172,672 | B1 | * | 1/2001 | Ramasubramanian et al. .......................... 715/720 |
| 6,243,139 | B1 | | 6/2001 | Takahashi et al. ........ 348/420.1 |
| 6,336,155 | B1 | | 1/2002 | Ito et al. |

FOREIGN PATENT DOCUMENTS

| | | |
|---|---|---|
| JP | 63-39287 | 2/1988 |
| JP | 63-313182 | 12/1988 |
| JP | 01-231583 | 9/1989 |
| JP | 1-231583 | 9/1989 |
| JP | 2-157878 | 6/1990 |
| JP | 4-35586 A | 2/1992 |
| JP | 4-44075 | 2/1992 |
| JP | 4-44076 | 2/1992 |
| JP | 4-44077 | 2/1992 |
| JP | 4-44078 | 2/1992 |
| JP | 4-44079 | 2/1992 |
| JP | 4-44080 | 2/1992 |
| JP | 4-44081 | 2/1992 |
| JP | 4-44082 | 2/1992 |
| JP | 4-44083 | 2/1992 |
| JP | 4-204980 | 7/1992 |
| JP | 4-204981 | 7/1992 |
| JP | 4-204982 | 7/1992 |
| JP | 4-204983 | 7/1992 |
| JP | 4-204984 | 7/1992 |
| JP | 5-83690 | 4/1993 |
| JP | 5-130602 | 5/1993 |
| JP | 5-328341 | 12/1993 |
| JP | 6-38186 | 2/1994 |
| JP | 6-38195 | 2/1994 |
| JP | 6-133298 A | 5/1994 |
| JP | 6-189301 | 7/1994 |
| JP | 7-50614 | 2/1995 |
| JP | 7-95566 | 4/1995 |
| JP | 7-131780 | 5/1995 |
| JP | 7-322256 A | 12/1995 |
| JP | 07-327223 | 12/1995 |
| JP | 7-336651 | 12/1995 |
| JP | 8-37660 | 2/1996 |
| JP | 8-111847 | 4/1996 |
| JP | 8-214222 A | 8/1996 |
| JP | 8-237651 | 9/1996 |

OTHER PUBLICATIONS

Mar. 1, 2005 Official Action in Japanese Patent Appln. No. 08-223373 (with partial translation).

Mar. 29, 2005 Official Action in Japanese Patent Appln. No. 08-291716 (with partial translation).

Apr. 26, 2005 Official Action in Japanese Patent Appln. No. 08-224914 (with partial translation).

Jul. 5, 2005 Official Action in Japanese Patent Appln. No. 08-224914 (with partial translation).

Aug. 23, 2005 Official Action in Japanese Patent Appln. No. 08-291716 (with partial translation).

Nov. 29, 2005 Official Action in Japanese Patent Appln. No. 08-223373 (with partial translation).

Nov. 20, 2007 Japanese Official Action in Japanese Patent Application No. 2005-308424 (with partial translation).

* cited by examiner

FIG. 10A

```
COMPRESSION  RATE  Y : 1 / 12
COMPRESSION  RATE  C : 1 / 32      PICTURE
FRAME  RATE : 15                   RECORDING
IMAGE  ANGLE  H : 640
IMAGE  ANGLE  V : 480
PIXEL : 345600

```
COMPRESSION  RATE : 1 / 12         PICTURE
FRAME  RATE : 30                   RECORDING
PIXEL : 86400

10 : 15  AM
    SPORT                          1995. 12. 10
```

FIG. 13A
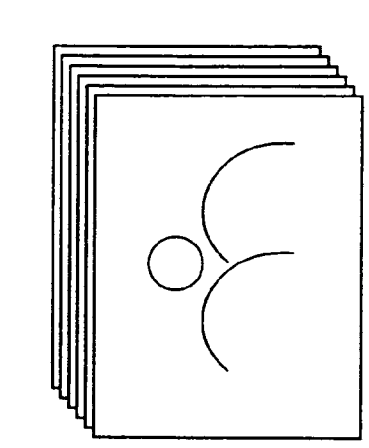
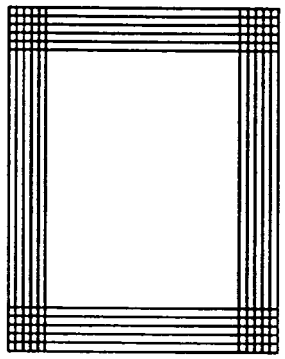
720 × 480
7 FRAMES / SEC
PRIORITY RESOLUTION MODE
FIG. 13B
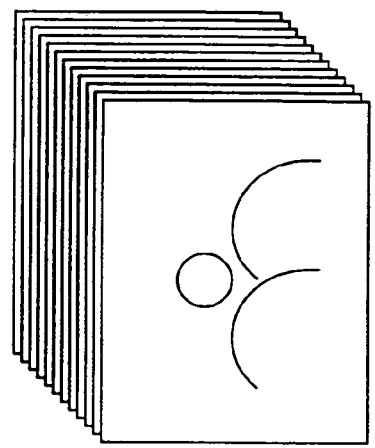
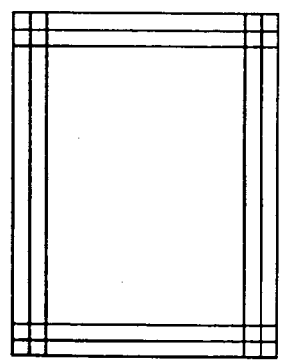
360 × 240
30 FRAMES / SEC
PRIORITY FRAME RATE MODE

IMAGE TRANSMISSION APPARATUS AND METHOD THEREFOR

This is a continuation of application Ser. No. 09/985,238, filed Nov. 2, 2001, allowed May 20, 2003, now U.S. Pat. No. 6,654,498 which is a divisional application of application Ser. No. 08/909,062, filed Aug. 14, 1997, now U.S. Pat. No. 6,337,928 B1.

BACKGROUND OF THE INVENTION

1. Field of the Invention

The present invention relates to an image transmission apparatus for transmitting image data and a method therefor.

2. Related Background Art

In the past, in order to watch and listen to video and audio picked up by a VTR built-in video camera or a video camera, the VTR built-in video camera or the video camera is connected to a monitor through a cord.

Alternatively, in order to wirelessly connect the VTR or the video camera to the monitor, the VTR or the video camera is connected to a transmission unit which is separate from the VTR built-in video camera or the video camera and the video and the audio are transmitted by FM-modulated infrared rays.

Recently, it has been proposed to wireless-transmit the video and audio data picked up by the VTR-built-in video camera or the video camera as a digital signal.

However, in the case of a cord connection, the work required to connect the VTR built-in video camera or the video camera with the monitor is troublesome. Further, because of the cord connection, the freedom of image pickup and watching is limited.

On the other hand, in the case of the FM-modulated infrared ray wireless connection, since the infrared ray transmission unit is separate, the connection of the VTR built-in video camera or the video camera with the infrared ray transmission unit is again needed and problems of degradation of information due to shortage of transmitted information, interference and disturbance, restriction to the directivity and short transmission distance are involved. Further, since the transmission amount is limited to a certain amount (for example, 128 Kbits/sec), information which is different from the intention of the user of the video camera may be transmitted.

SUMMARY OF THE INVENTION

From the background described above, it is an object of the present invention to provide an image transmission apparatus which increases the freedom of image transmission, improves the operability and can externally transmit the intended information, and a method therefor.

For this purpose, in accordance with one preferred embodiment, the image transmission apparatus/method is characterized by inputting image data, detecting the motion of the image data, setting a transmission condition of the image data in accordance with the detection of the motion of the image data, processing the image data in accordance with the set transmission condition and transmitting the processed image data.

Further, in accordance with another preferred embodiment the image transmission apparatus/method is characterized by detecting an image pickup condition of the image pickup means for picking up an image, decreasing the information amount of image data from the image pickup means, controlling the decreasing operation in accordance with the image pickup condition and transmitting the image data having the information amount decreased.

Further, in accordance with another preferred embodiment, the image transmission apparatus/method is characterized by picking up an image to acquire image data, setting an image pickup operation mode, determining a transmission condition of the image data in accordance with the set condition, processing the image data in accordance with the determined transmission condition and transmitting the processed image data.

Other objects, features and advantages of the invention will become apparent from the following detailed description taken in conjunction with the accompanying drawings.

BRIEF DESCRIPTION OF THE DRAWINGS

FIGS. 13A and 13B show relations between the number of frames and a frame rate in a frame preference mode and a resolution preference mode.

DETAILED DESCRIPTION OF THE PREFERRED EMBODIMENTS

The image transmission apparatus of the present invention is now explained in connection with a VTR built-in video camera.

Figure 1:
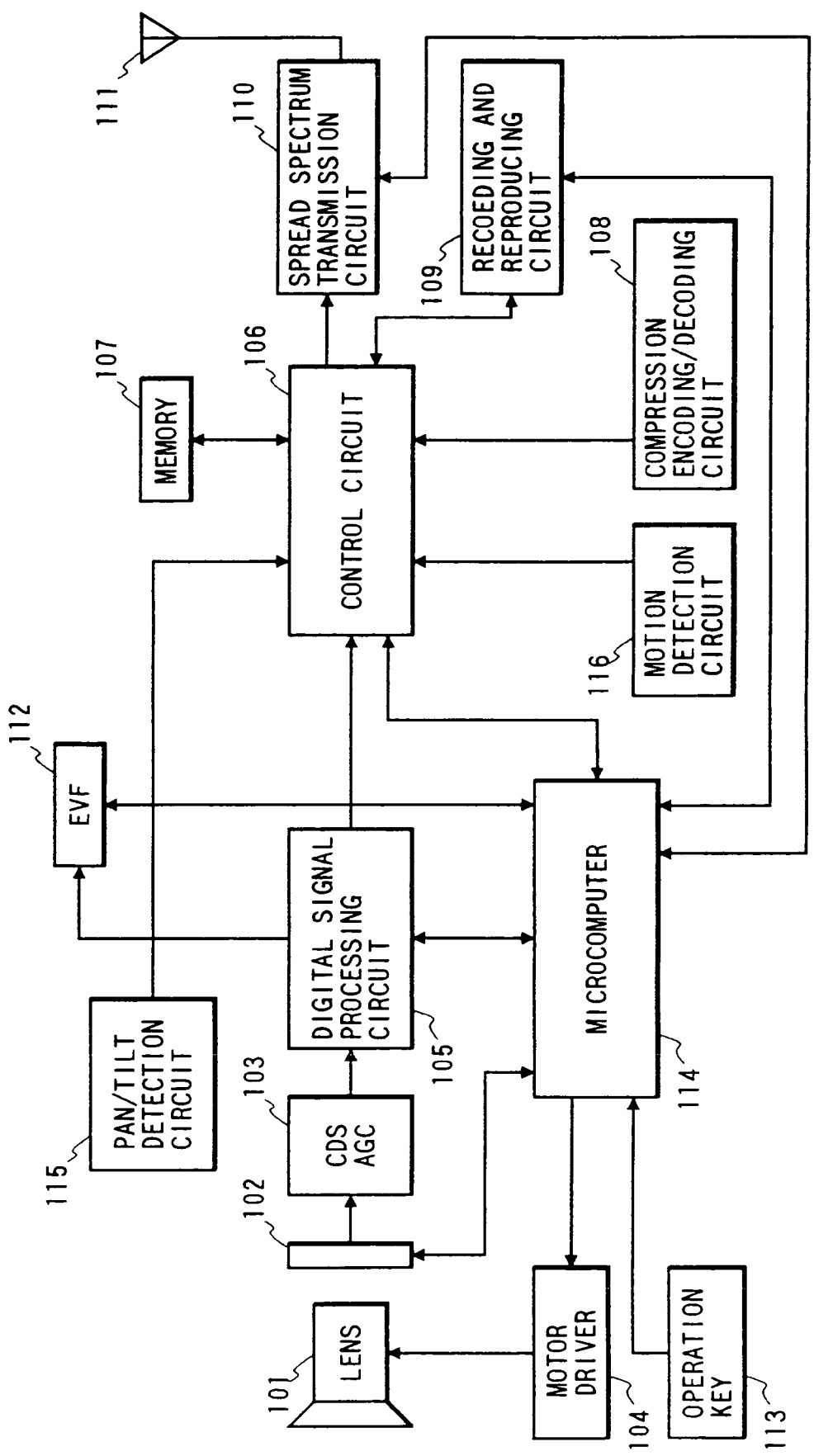
FIG. 1 shows a block diagram of a configuration of a VTR built-in video camera in accordance with the present invention.

FIG. 1 shows a block diagram of a configuration of a VTR built-in video camera in accordance with the present invention.

In FIG. 1, numeral 101 denotes a lens for picking up an image, numeral 102 denotes an image pickup element for focusing the image, numeral 103 denotes a CDS (dual correlation sampling)/AGC (automatic gain control) for sampling and holding the image and amplifying it to an appropriate level, numeral 104 denotes a motor driver for driving a lens for focusing or zooming, numeral 105 denotes a digital signal processing circuit for digitally processing image data, numeral 106 denotes a control circuit for controlling peripheral blocks, numeral 107 denotes a memory for digital processing, numeral 108 denotes a compression encoding/decoding circuit for compressing and decompressing the image data, numeral 109 denotes a recording and reproducing apparatus (VTR) for recording and reproducing the image data, numeral 110 denotes a spread spectrum transmission circuit for transmitting the image data, numeral 111 denotes an antenna, numeral 112 denotes an electronic view finder for displaying an image and image pickup information, numeral 113 denotes an operation key, numeral 114 denotes a microcomputer for controlling a system, numeral 115 denotes a detection circuit for detecting pan or tilt of the VTR built-in video camera and numeral 116 denotes a motion detection circuit for detecting the motion of the image data.

An operation of the VTR built-in video camera thus configured will be explained later.

Figure 2:
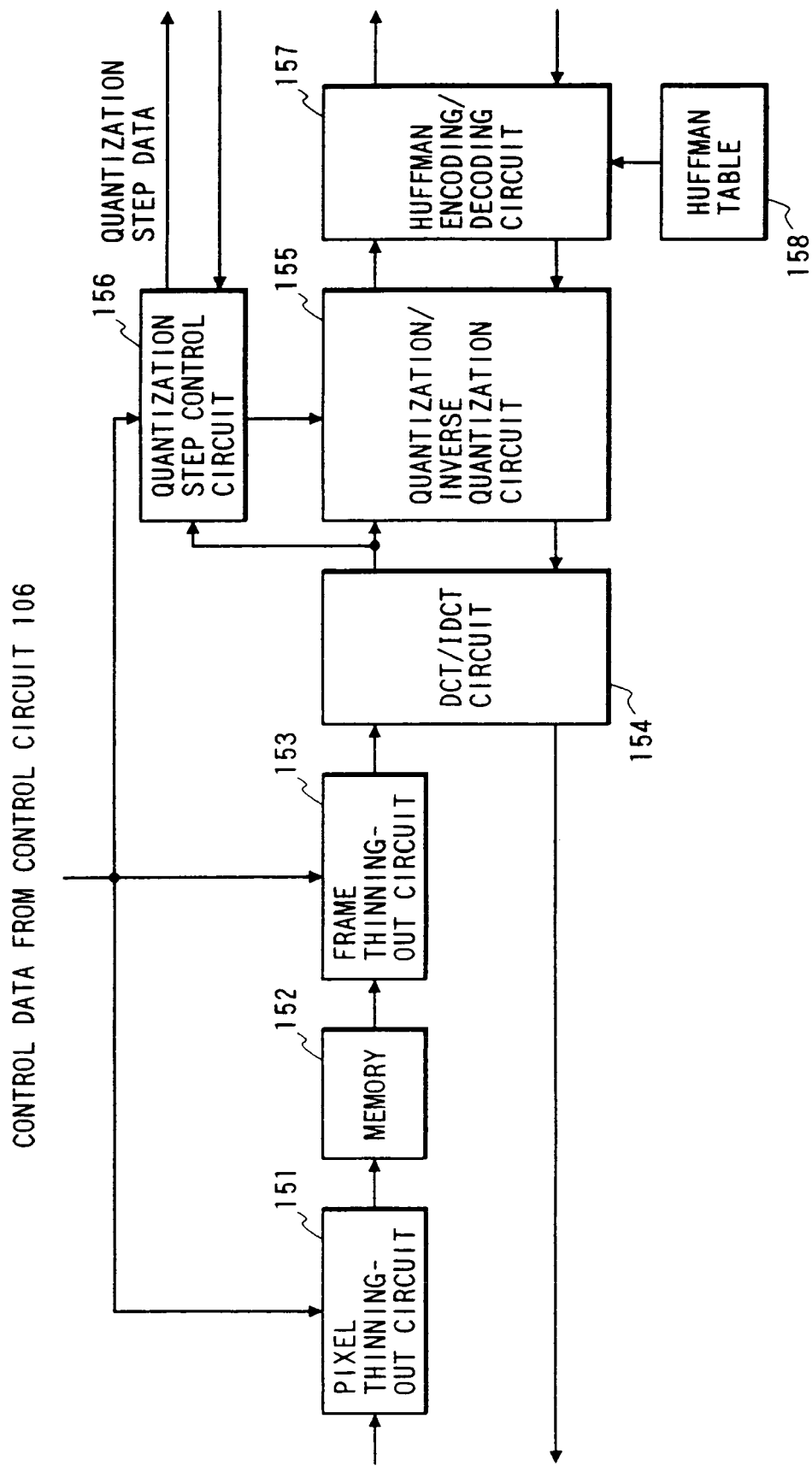
FIG. 2 shows a block diagram of detail of a compression encoding/decoding circuit 108 of FIG. 1.

FIG. 2 shows a block diagram of the detail of the compression encoding/decoding circuit 108 of FIG. 1.

In FIG. 2, numeral 151 denotes a pixel thinning-out circuit, numeral 152 denotes a memory, numeral 153 denotes a frame thinning-out circuit for thinning out the number of frames per second of the image data from a standard number, numeral 154 denotes a DCT (discrete cosine transform)/IDCT (inverse discrete cosine transform) circuit, numeral 155 denotes a quantization/inverse-quantization circuit, numeral 156 denotes a quantization step control circuit for controlling a quantization step of the quantization/inverse-quantization circuit 155, numeral 157 denotes a Huffman code/decode circuit and numeral 158 denotes a Huffman table.

An operation of the compression encoding/decoding circuit 108 thus configured is described below.

First, an encoding operation is explained.

The image data inputted to the compression encoding/decoding circuit 108 is supplied to the pixel thinning-out circuit 151 and the pixels are thinned out in accordance with control data from the control circuit 106.

The image data outputted from the pixel thinning-out circuit 151 is temporarily stored in the memory 152. The frame thinning-out circuit 153 reads the image data stored in the memory 152 and thins out the frames in accordance with control data from the control circuit 106.

The image data outputted from the frame thinning-out circuit 153 is divided into blocks for every 8×8 pixels by the DCT/IDCT circuit 154 to conduct the DCT conversion for each block. The DCT converted image data is supplied to the quantization/inverse-quantization circuit 155 and the quantization step control circuit 156.

The quantization step control circuit 156 collects a plurality of blocks of DCT converted image data, determines the quantization step such that a predetermined code amount is acquired when the plurality of blocks of image data are coded and outputs quantization step data indicating the determined quantization step to the quantization/inverse-quantization circuit 155 and the control circuit 106.

The quantization step data is added to the coded image data by the control circuit 106 and transmitted to a succeeding stage circuit.

The quantization step control circuit 156 is controlled by the control data from the control circuit 106 as the pixel thinning-out circuit 151 and the frame thinning-out circuits are controlled also.

Operation controls of the pixel thinning-out circuit 151, the frame thinning-out circuit 153 and the quantization step control circuit 156 by the control data from the quantization step control circuit 156 will be explained later.

In the quantization/inverse-quantization circuit 155, the DCT converted image data is quantized by using the quantization step data from the quantization step control circuit 154. The image data quantized by the quantization/inverse-quantization circuit 155 is Huffman-coded by the Huffman code/decode circuit 153 by using the Huffman table 158 and it is outputted.

The decode operation is now explained.

The coded image data is Huffman-decoded by the Huffman code/decode circuit 157 in accordance with the Huffman table 158.

The Huffman-decoded image data is dequantized by the quantization/inverse-quantization circuit 155. The quantization step is set by the quantization step control circuit 156 based on the result of identification conducted by the control circuit 106 which identifies the quantization step data added to the coded image data and transmitted.

The image data dequantized by the quantization/inverse-quantization circuit 155 is IDCT-transformed by the DCT/IDCT circuit 154 and it is outputted.

Figure 3:
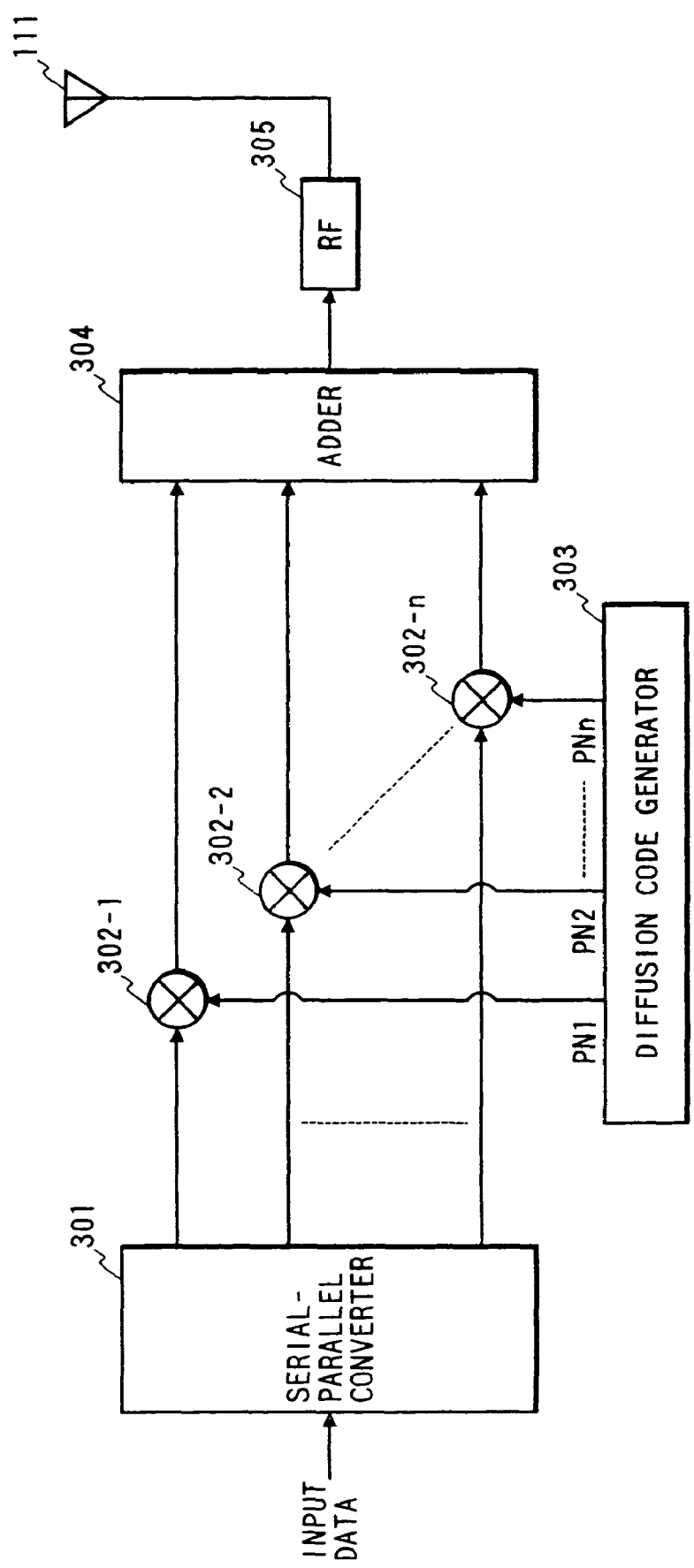
FIG. 3 shows a block diagram of a configuration of a spread spectrum transmission circuit 110 of FIG. 1.

FIG. 3 shows a block diagram of a detailed configuration of the spread spectrum transmission circuit 110 of FIG. 1.

In FIG. 3, numeral 301 denotes a serial-parallel converter from serial-parallel converting the image data, numeral 301-1 to 302-n denote multipliers, numeral 303 denotes a spread code generator, numeral 304 denotes an adder and numeral 305 denotes an RF (radio frequency) converter for converting into an RF signal.

An operation of the spread spectrum transmission circuit 110 thus configured is now explained.

The input image data is converted to n parallel data by the serial-parallel converter 301 and the respective converted data are multiplied by n different spread code outputs of the spread code generator 303 in the n multipliers 302-1 to 302-n, added by the adder and output to the RF converter 305. The added base band wide spread signal is converted to a transmission frequency signal having a proper center frequency by the RF converter 305 and output from the transmission antenna 111.

Figure 4:
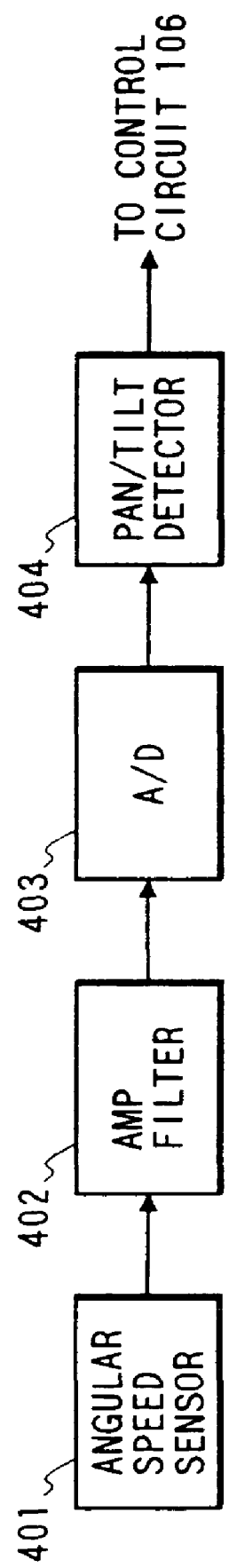
FIG. 4 shows a block diagram of a detailed configuration of a pan/tilt detection circuit 113 of FIG. 1.

FIG. 4 shows a block diagram of a detailed configuration of the pan/tilt detection circuit 115 of FIG. 1.

In FIG. 4, numeral 401 denotes an angular velocity sensor, numeral 402 denotes an amplifier/filter for amplifying the output of the angular velocity sensor 401 and limiting a band of the signal, numeral 403 denotes an A/D converter for converting the analog output of the amplifier/filter 402 to a digital signal and numeral 404 denotes a pan/tilt detection circuit for detecting the pan and the tilt of the camera shown in FIG. 1 based on the output of the A/D converter 403.

An operation of the pan/tilt detection circuit 115 thus configured is now explained.

When the orientation of the camera is changed by the pan or the tilt, the angle sensor 401 outputs a signal in accordance with an angular velocity of the change of the orientation.

The output of the angular velocity sensor 401 is amplified and band-limited by the amplifier/filter 402, digitized by the A/D converter 403 and inputted to the pan/tilt detection circuit 404.

Figure 5:
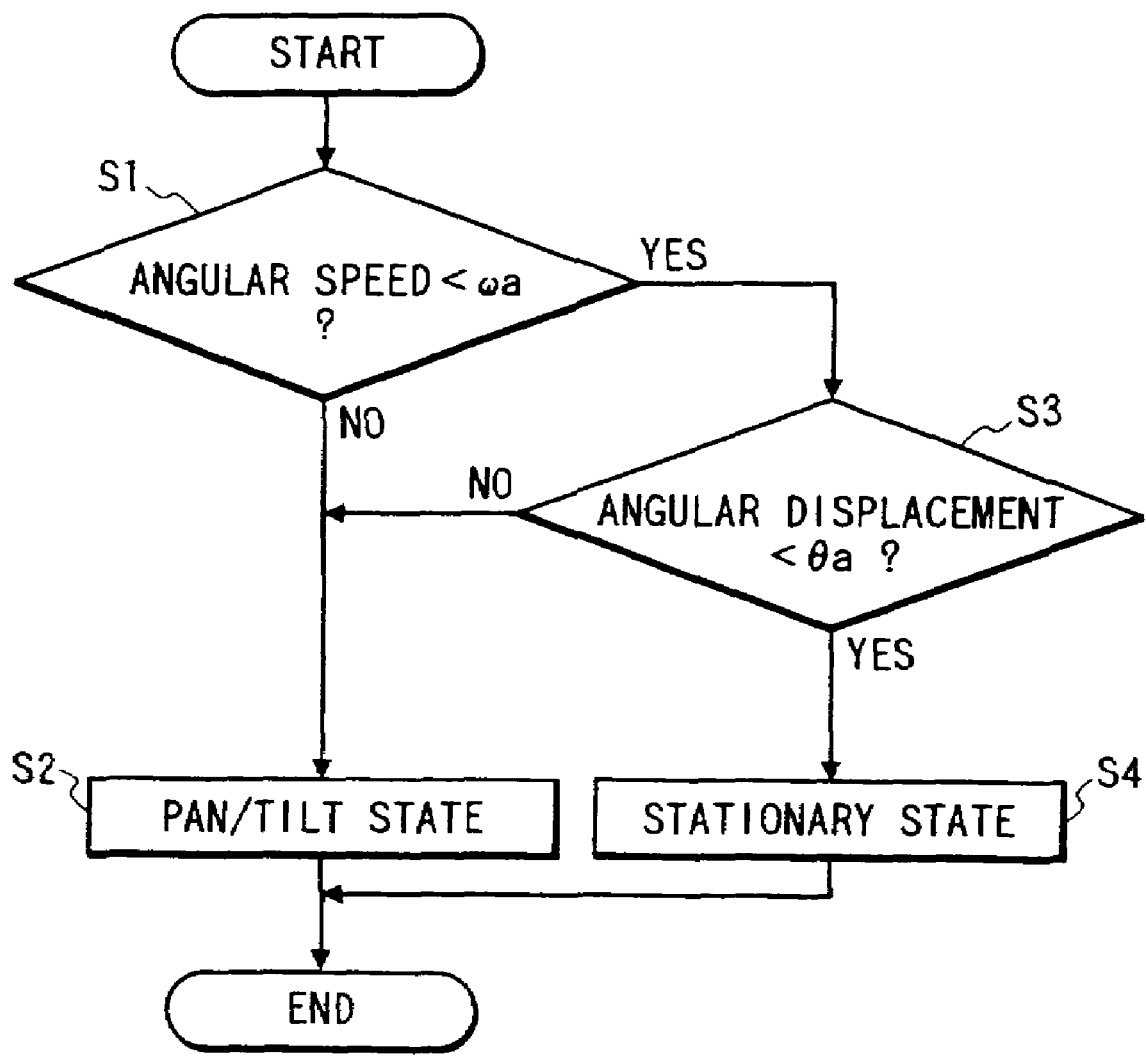
FIG. 5 shows an operation flow chart of a pan/tilt detector 404.

FIG. 5 shows an operation flow chart of the pan/tilt detector 404.

First, it determines whether the angular velocity is not smaller than a predetermined threshold $\omega a$ or not (S1), and if the angular velocity is not smaller than the threshold $\omega a$, it is determined as the pan/tilt condition (S2). If an angular displacement which is an integration of the angular velocity is not smaller than a threshold $\Theta a$ even if the angular velocity is smaller than the threshold ωa (S3), it is also determined as the pan/tilt condition (S2). If the angular displacement is smaller than Θa, it is determined as a steady state (S4).

The detection result by the pan/tilt detection circuit 404 is applied to the pixel thinning-out circuit 151 and the frame thinning-out circuit 153 and used for the control of the number of thinning-out of the pixels and the number of thinning-out of the frames.

Figure 6:
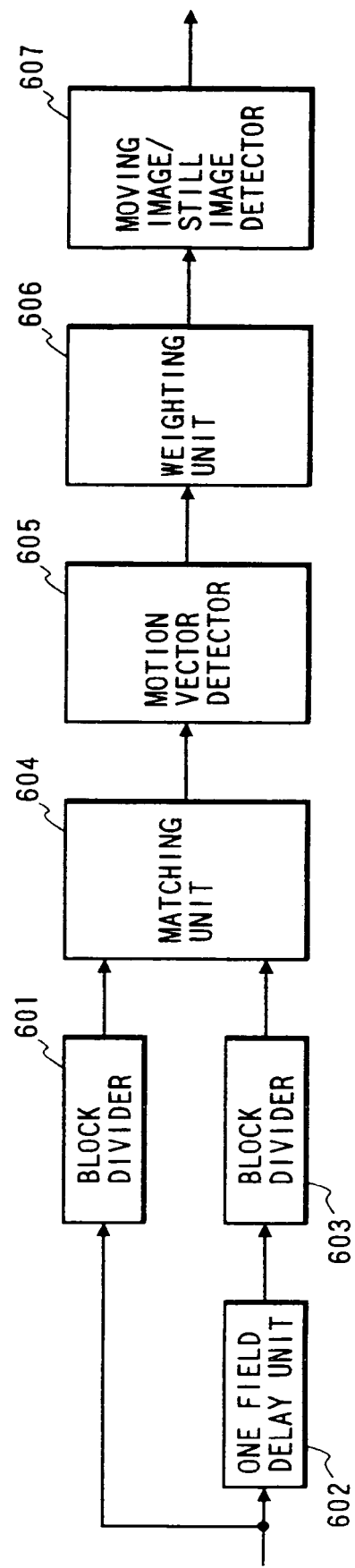
FIG. 6 shows a block diagram of a detailed configuration of a motion detection circuit 116.

FIG. 6 shows a block diagram of a detailed configuration of the motion detection circuit 116.

In FIG. 6, numerals 601 and 603 denote a block divider for dividing the data into 16×16 pixel blocks, numeral 602 denotes a one-field delay circuit for delaying the input image data by one field period, numeral 604 denotes a matching circuit for matching the outputs from the block dividers 601 and 603 for each block to calculate a correlation distribution, numeral 605 denotes a motion vector detector for calculating a motion vector of each block based on the output from the matching circuit, numeral 606 denotes a weighting circuit for applying a predetermined weight to the motion vector of each block and numeral 607 denotes a motion/still image detector for detecting whether the current image is a motion image or a still image based on the output of the weighting circuit 606.

An operation of the motion detection circuit 116 thus configured is now explained.

The image data input from the control circuit 106 is divided into 16×16 pixel blocks by the block divider 601. The input image data is also delayed by one field by the one-field delay circuit 602 and divided into 16×16 pixel blocks by the block divider 603 as the block divider 601 does.

The matching circuit 604 matches the outputs of the block dividers 601 and 603 for each block to calculate the correlation distribution. The motion vector detector 605 for each block calculates the motion vector for each block from the correlation distribution calculated by the matching circuit 604.

A predetermined weight is applied to the motion vector of each block detected by the motion detector 605.

For example, a large weight is applied to a center of the screen and a small weight is applied to a periphery of the screen. Namely, the center of the screen is weighted.

The motion-still image detector 607 detects whether a current image is a motion picture or a still picture in accordance with the output of the weighting circuit 606. The detection result of the motion/still image detector 607 is transmitted to the pixel thinning-out circuit 151 and the frame thinning-out circuit 153 through the control circuit 106.

An operation of the VTR built-in video camera configured as shown in FIG. 1 is now explained.

In the configuration of FIG. 1, the operation of the VTR built-in video camera is conducted through the operation key 113.

In the pickup mode of the video camera, an object image is focused on an image pickup element 102 (for example, a CCD) by the lens 101.

The image data derived from the image pickup element 102 is sampled and amplified by the CDS/AGC circuit 103 and inputted to the digital signal processing circuit 105. The digital signal processing circuit 105 conducts the gamma processing and the white balance adjustment to the input image data.

The lens 101 receives a control command of the microcomputer 114 for the zooming and the focusing and is driven by the motor driver 104. The image data is transmitted from the digital signal processing circuit 105 to the EVF 112 for monitoring the image being picked up and the image pickup data. The image pickup data (for example, tape counter, various alarms and image pickup operation mode) and control command are transmitted from the microcomputer 114 to the EVF 112.

On the other hand, the image data is coded by the compression encoding/decoding circuit 108 by using the control circuit 106 and the memory 107 and recorded in the recording and reproducing circuit 109.

Based on the information set by the user of the video camera by the operation switch 135 on the operation key 113 of the main unit, coded data for transmission and timing are generated by using the digital signal processing circuit 105, the control circuit 106, the memory 107, the compression encoding/decoding circuit 108, the microcomputer 114, the pan/tilt detection circuit 115 and the motion detection circuit 116 and the image data to be transmitted is wireless transmitted from the antenna 111 by the spread spectrum transmission circuit 110 by the set transmission method and transmission image quality.

Figure 7:
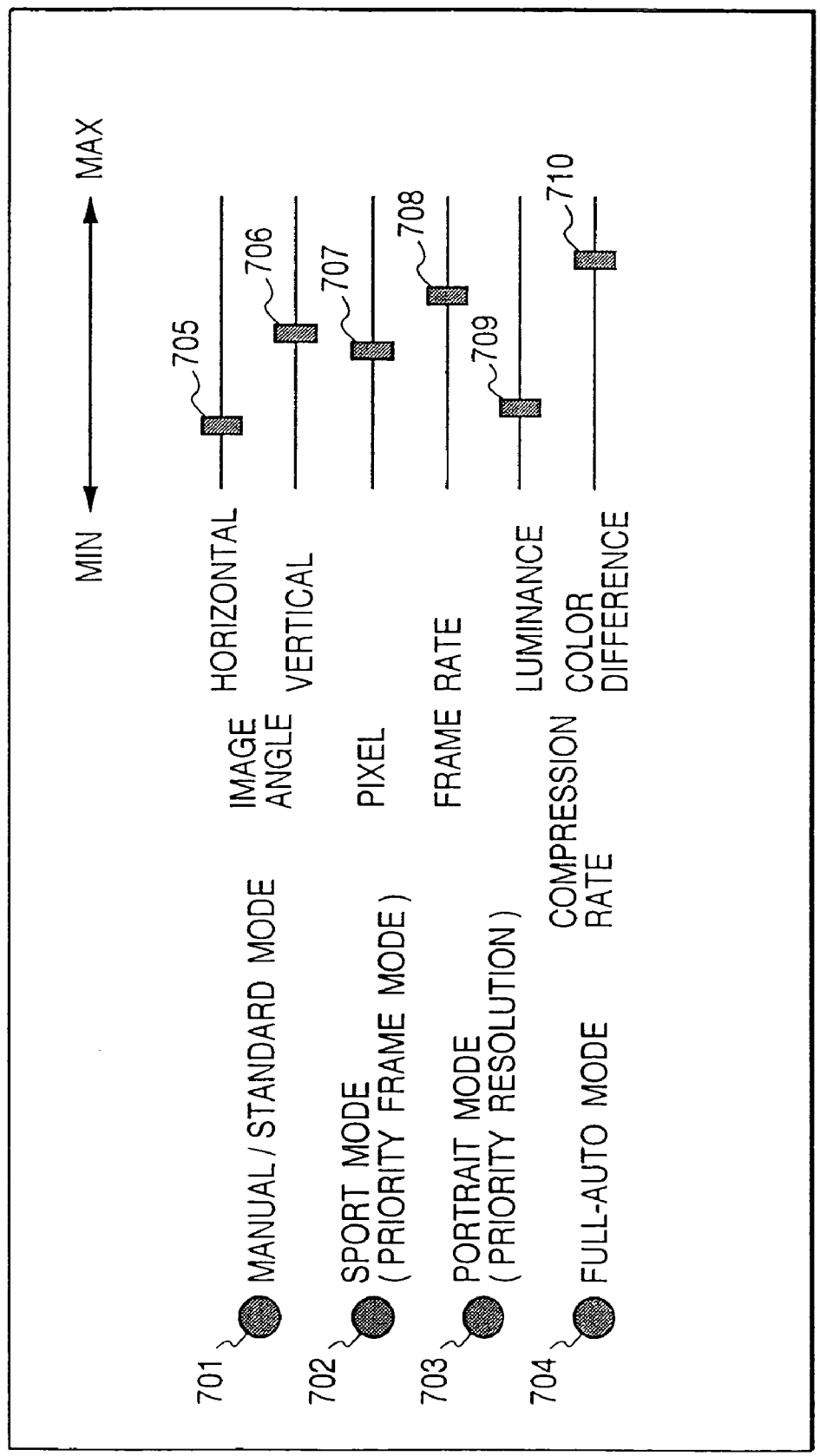
FIG. 7 shows a transmission method of image data in an operation key 113 and an operation switch for image pickup/transmission mode selection of transmission image quality.

FIG. 7 shows the transmission method of the image data in the operation key 113 and the operation switch for the image pickup/transmission mode selection of the transmission image quality.

By operating the operation key 113 of FIG. 7, a user-desired image can be transmitted even for the wireless transmission in which a maximum transmission rate is smaller than that of wire transmission.

As the image pickup/transmission mode switches, a manual/standard selection switch 701, a sports mode (a frame rate preference mode) selection switch 702, a portrait mode (a resolution preference mode) selection switch 703 and a full-auto mode selection switch 704 are provided.

The manual/standard mode selection switch 701 switches the manual mode and the standard mode for each operation. When the manual/standard mode selection switch 701 is operated when the sports mode (frame rate preference mode), the portrait mode (resolution preference mode) or the full-auto mode is set, the mode is switched to the standard mode.

The respective modes are now explained.

The parameters which can be set in the manual mode include a horizontal image angle size, a vertical image angle size, the number of pixels per frame, a frame rate (the number of frames/second), a compression rate of a luminance signal and a compression rate of a color signal. The respective parameters may be set in various manners by operating slide switches 705 to 710.

The parameters which may be set by the slide switches are not limited to the above and switches for various parameters for the transmission such as an audio compression ratio, a transmission protocol and a transmission power may be provided.

In the sports mode, the portrait mode and the full-auto mode, the setting ratios of the number of pixels, the frame rate and the compression rate are different.

Figure 8:
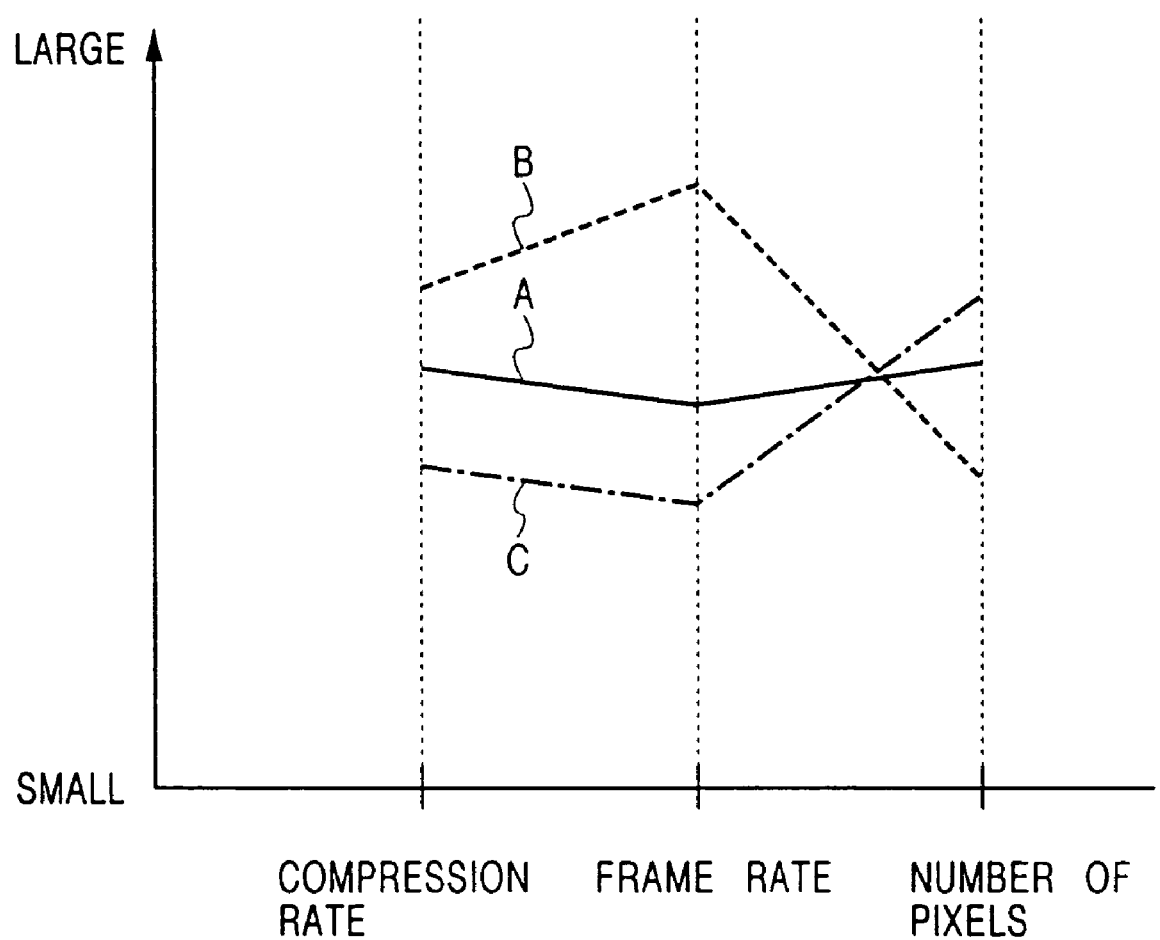
FIG. 8 illustrates a setting ratio of parameters in an image pickup/operation mode in an embodiment.

FIG. 8 illustrates the setting ratios of the parameters in the sports mode (frame rate preference mode), the portrait mode (resolution preference mode) and the full-auto mode.

In FIG. 8, an abscissa represents the parameters (compression ratio, frame rate and the number of pixels) and an ordinate represents the magnitude of numerals.

In the standard mode, the ratio A is set, and in the sports mode (frame rate preference mode), the ratio B for the preference of the frame mode is set and the number of pixels is reduced from the standard by the control of the pixel thinning-out circuit 151, and the weighting is applied to the quantization step by the quantization step control circuit 156 to increase the frame rate. In the sports mode, the frame rate may be controlled to increase by increasing the compression ratio without reducing the number of pixels. The frame rate by the sports mode is a maximum frame rate (for example, 30 frames/second) which can be attained by the video camera.

In the portrait mode (resolution preference mode), the ratio is set to C for the preference of the resolution, and the number of pixels is increased from the standard by the control of the pixel thinning-out circuit 151, the frame rate is reduced from the standard by the control of the frame rate thinning-out circuit 153, and the weighting is applied to the quantization step by the quantization step control circuit 156 to reduce the compression ratio from the standard. By this process, a high resolution and high quality image is attained although the frame rate is dropped.

When the sports mode or the portrait mode is set when the image data is to be transmitted together with the image pickup of the VTR built-in video camera, a charge storage time of the image pickup element 102 is set shorter than that in the standard mode by the microcomputer 114 and an object depth is set shallow. A focus following velocity of the lens 101 driven through the motor driver 104 is fastest in the sports mode, next fastest in the standard mode and slowest in the portrait mode. In a full-auto mode, the image pickup element 102 and the motor driver 104 operate in the same manner as that in the standard mode as opposed to the sports mode and the portrait mode.

FIGS. 13A and 13B show relations between the number of pixels and the frame rate in the frame preference mode and the resolution preference mode in the present embodiment.

In the full-auto mode, whether the image is a motion image or a still image is determined by the pan/tilt detection circuit 115 and the motion detection circuit 116, and when it is the motion image, the pixel thinning-out circuit 151, the frame rate thinning-out circuit 153 and the quantization step control circuit 156 are controlled to set the ratio B, and when it is the still image, they are controlled to set the ratio C.

Namely, in the full-auto mode, the frame preference mode or the resolution preference mode is automatically selected in accordance with the motion of the image.

In the present embodiment, the manual mode, the standard mode, the sports mode (frame rate preference mode), the portrait mode (resolution preference mode) and the full-auto mode are shown as the image pickup/transmission modes, the ratios of the parameters may be programmed in other operation modes for setting the image quality. As to the sorts of the parameters, parameters such as audio compression ratio, transmission protocol and transmission power may be used.

A wireless transmission operation of the VTR built-in video camera using the operation key shown in FIG. 7 is now explained with reference to a flow chart of FIG. 9.

Figure 9:
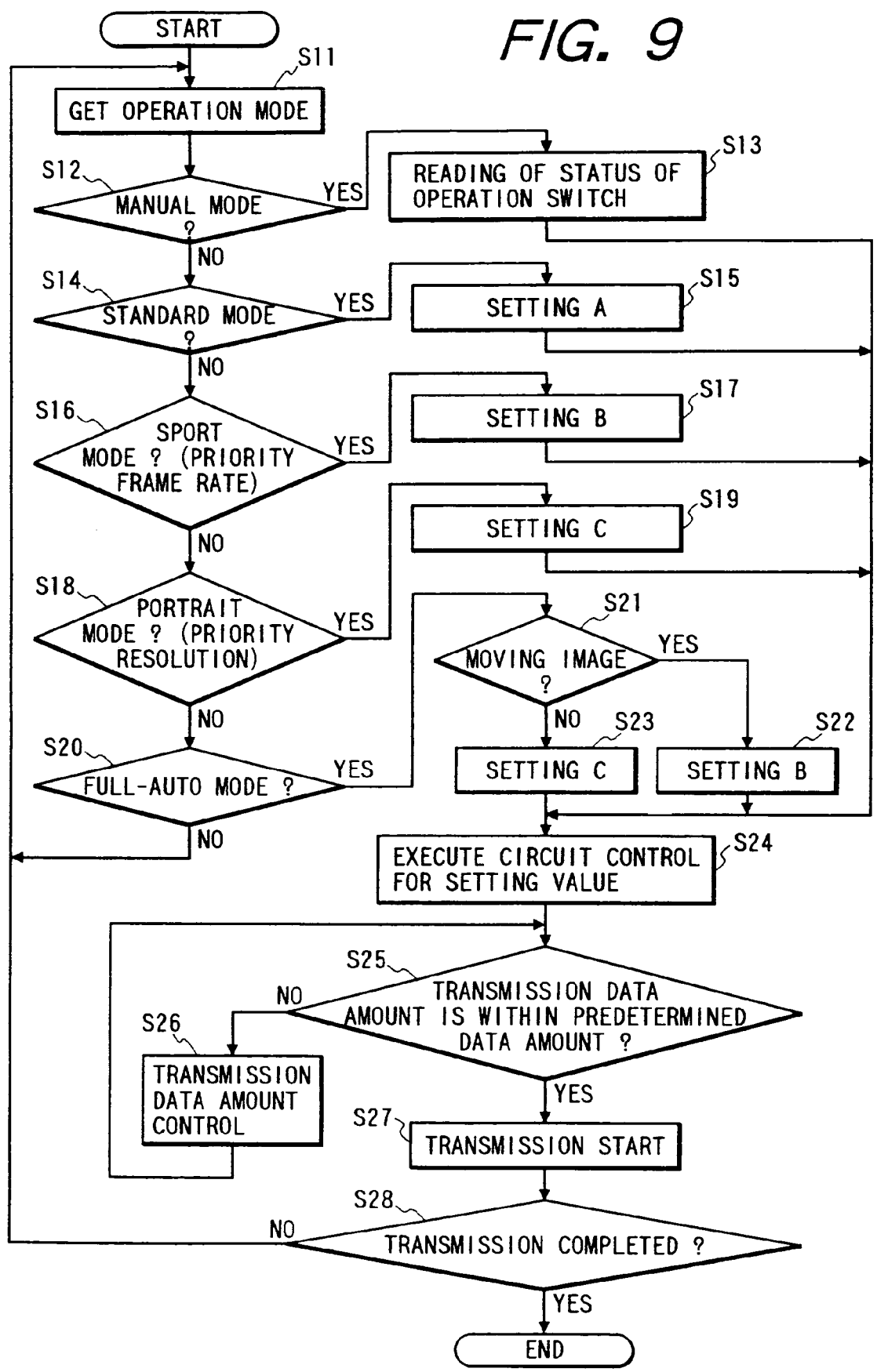
FIG. 9 shows a flow chart of an operation of the VTR built-in video camera by the operation key shown in FIG. 7, FIGS. 10A and 10B show examples of display of an EVF 112 in an embodiment.

FIG. 9 shows a flow chart of an operation of the VTR built-in video camera by the operation switch shown in FIG. 7.

First, in a step S11, a state of the operation switch (see FIG. 7) operated by the user of the video camera is read.

In a step S12, whether the manual mode is set or not is determined. If the manual mode is set, the process proceeds to a step S13 to read the set states of the slide switches 705 to 710 shown in FIG. 7 to determine the settings to control the pixel thinning-out circuit 151, the frame rate thinning-out circuit 153 and the quantization step control circuit 156.

In the step S12, if the manual mode is not set, the process proceeds to a step S14 to determine whether the standard mode is set or not. If the standard mode is set, the process proceeds to a step S15 to determine the setting to control the pixel thinning-out circuit 151, the frame rate thinning-out circuit 153 and the quantization step control circuit 156 to set the setting ratio A of FIG. 8.

In the step S14, if the standard mode is not set, the process proceeds to a step S16 to determine whether the sports mode (frame rate preference mode) is set or not. If the sports mode (frame rate preference mode) is set, the process proceeds to a step S17 to determine the setting to control the pixel thinning-out circuit 151, the frame rate thinning-out circuit 153 and the quantization step control circuit 156 to set the setting ratio B of FIG. 8, and the process proceeds to a step S24.

In the step S16, if the sports mode (frame rate preference mode) is not set, the process proceeds to a step S18 to determine whether the portrait mode (resolution preference mode) is set or not. If the portrait mode (resolution preference mode) is set, the process proceeds to a step S19 to determine the settings to control the pixel thinning-out circuit 151, the frame rate thinning-out circuit 153 and the quantization step control circuit 156 to set the setting ratio C of FIG. 8, and the process proceeds to a step S24.

In the step S18, if the portrait mode (resolution preference mode) is not set, the process proceeds to a step S20 to determine whether the full-auto mode is set or not. If the full-auto mode is set, the process proceeds to a step S21 to determine whether the input image data is a motion image or not.

In the determination method for the motion image in the step S21, whether the input image data is a motion image or not is determined by determining whether the pan/tilt state is set or not by the pan/tilt detection circuit.

Namely, when it is determined as the pan/tilt state by the pan/tilt detection circuit 115, it is determined that the input image data is a motion image. If it is not the pan/tilt state, whether the input image data is a motion picture or not is determined by the motion detection by the motion detection circuit 116.

If it is determined as the motion image in the step S21, the process proceeds to a step S22 to determine the setting to control the pixel thinning-out circuit 151, the frame rate thinning-out circuit 153 and the quantization step control circuit 156 to set the setting ratio B of FIG. 8 and the process proceeds to a step S24.

If it is determined as not a motion image in the step S21, the process proceeds to a step S23 to determine the settings to control the pixel thinning-out circuit 151, the frame rate thinning-out circuit 153 and the quantization step control circuit 156 to set the setting ratio C of FIG. 8, and the process proceeds to a step S24.

If the full-auto mode is not set in the step S20, the process returns to the step S11 to read the state of the operation switch (see FIG. 7) to conduct the mode determination again.

In the step S24, the operations of the pixel thinning-out circuit 151, the frame rate thinning-out circuit 153 and the quantization step control circuit 156 are controlled to set the settings determined in the steps S15, S17, S19, S22 and S23.

In a step S25, whether the transmission data is within a transmission capacity or not is determined. If it exceeds the transmission capacity, the process proceeds to a step S26 to control the quantization step control circuit 156 to adjust the quantization step to suppress the transmission data amount within the transmission capacity.

In the step S25, if it is within the transmission capacity, the process proceeds to a step S27 to start the data transmission.

In a step S28, whether the data transmission is completed or not is determined, and if the data transmission is not completed, the process returns to the step S11. If the data transmission is completed, the flow is terminated.

The settings determined in the steps S15, S17, S19, S21, S23 and S22 are stored in a ROM table built in the system in the present embodiment.

In the present embodiment, an operation state of the camera is displayed on the EVF 112 to allow the user of the video camera to recognize the operation state of the video camera.

FIGS. 10A and 10B show examples of the display of the EVF 112 of the present embodiment.

FIG. 10 shows an example of the display of the EVF 112 in the manual mode and FIG. 10B shows an example of the display of the EVF 112 in the sports mode. "Record" in the figure indicates a recorder operation mode in the VTR built-in video camera and "10:15 AM" and "1995.12.10" indicates an auto date.

An apparatus for receiving the data wireless-transmitted by the VTR built-in video camera of FIG. 1 is now explained.

Figure 11:
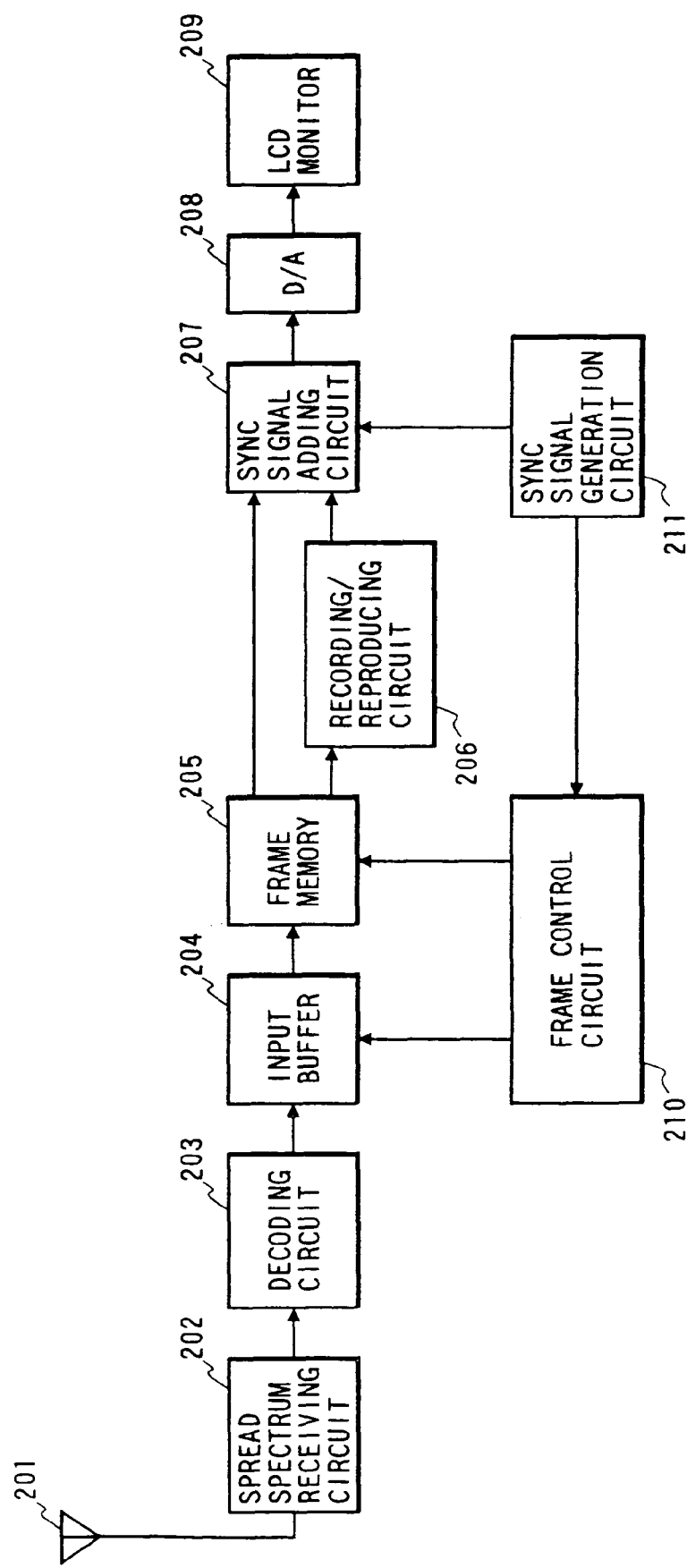
FIG. 11 shows a block diagram of a configuration of a receiver in an embodiment.

FIG. 11 shows a block diagram of a configuration of a receiving apparatus in the embodiment.

In FIG. 11, numeral 201 denotes an antenna, numeral 202 denotes a spread spectrum receiving circuit for spectrum inverse-spreading the signal received by the antenna 201 (by correlating the received signal with the same spread signal as that of the transmitter), converting the received signal to a narrow band signal having a band width corresponding to the original data and conducting the normal data demodulation to reproduce the original data. Numeral 203 denotes a decoding circuit for demodulating the image data reproduced by the spread spectrum receiving circuit 202, numeral 204 denotes an input buffer for temporarily storing the decoded image data, numeral 205 denotes a frame memory for storing one frame of image data, and numeral 206 denotes a recording and reproducing circuit for temporarily storing the image data output from the frame memory 205 in a recording medium and reproducing it as required. Numeral 207 denotes a synchronization signal addition circuit for adding video synchronization signal data to the image data read from the frame memory 205 to convert it to video data, numeral 208 denotes a D/A converter, numeral 209 denotes a monitor (for example, a liquid crystal monitor) for video-displaying the video signal output from the D/A converter 208, numeral 210 denotes a frame control circuit for controlling the input buffer 204 and the frame memory 205 and outputting one frame of received image data from the frame memory 205, and numeral 211 denotes a synchronization signal generation circuit for generating a synchronization signal for defining a timing of the overall system and a video synchronization signal of the received image data.

An operation of the receiving apparatus thus configured is now explained.

The spread spectrum receiving circuit 202 spectrum inverse-spreads the signal received by the antenna 201 to convert the received signal to a narrow band signal of the band width of the original data to demodulate the original data.

The demodulated image data is supplied to the decoding circuit 203 for decoding processing. The decoded image data is stored in the frame memory 205 through the input buffer 204. When the frame memory 205 stores one frame of image data, it reads out the image data.

The image data read out from the frame memory 205 is supplied to the synchronization signal addition circuit 207 or recorded and reproduced by the recording and reproducing circuit 206 and then supplied to the synchronization signal addition circuit 207.

The synchronization signal addition circuit 207 adds the video synchronization signal data from the synchronization signal generation circuit 211 to the image data from the frame memory 205 or the recording and reproducing circuit 206. The D/A converter 208 converts the digital output of the synchronization signal addition circuit 207 to an analog signal and supplies it to the LCD monitor 209. The LCD monitor 209 displays the supplied image signal.

As described herein above, in accordance with the present embodiment, since the wireless transmission is conducted by freely selecting the transmission method and the transmission image quality which the user of the video camera desires, the information desired by the user of the video camera may be transmitted. Further, since the information of the optimum transmission method and the transmission image quality is automatically generated in accordance with the operation mode in the image pickup mode and it is wireless-transmitted, the work of the user of the video camera may be saved and the optimum wireless transmission may be conducted.

Further, since the spread spectrum transmission system is used for the wireless transmission, the transmission information amount may be increased, the degradation of the information by interference and disturbance may be prevented, the directivity is enhanced and the transmission distance may be extended. Further, since the setting information is displayed in the finder, the failure of the transmission state may be prevented and the operability is improved.

The operation switch of the present embodiment shown in FIG. 7 is a mere example and various forms may be adopted.

Figure 12:
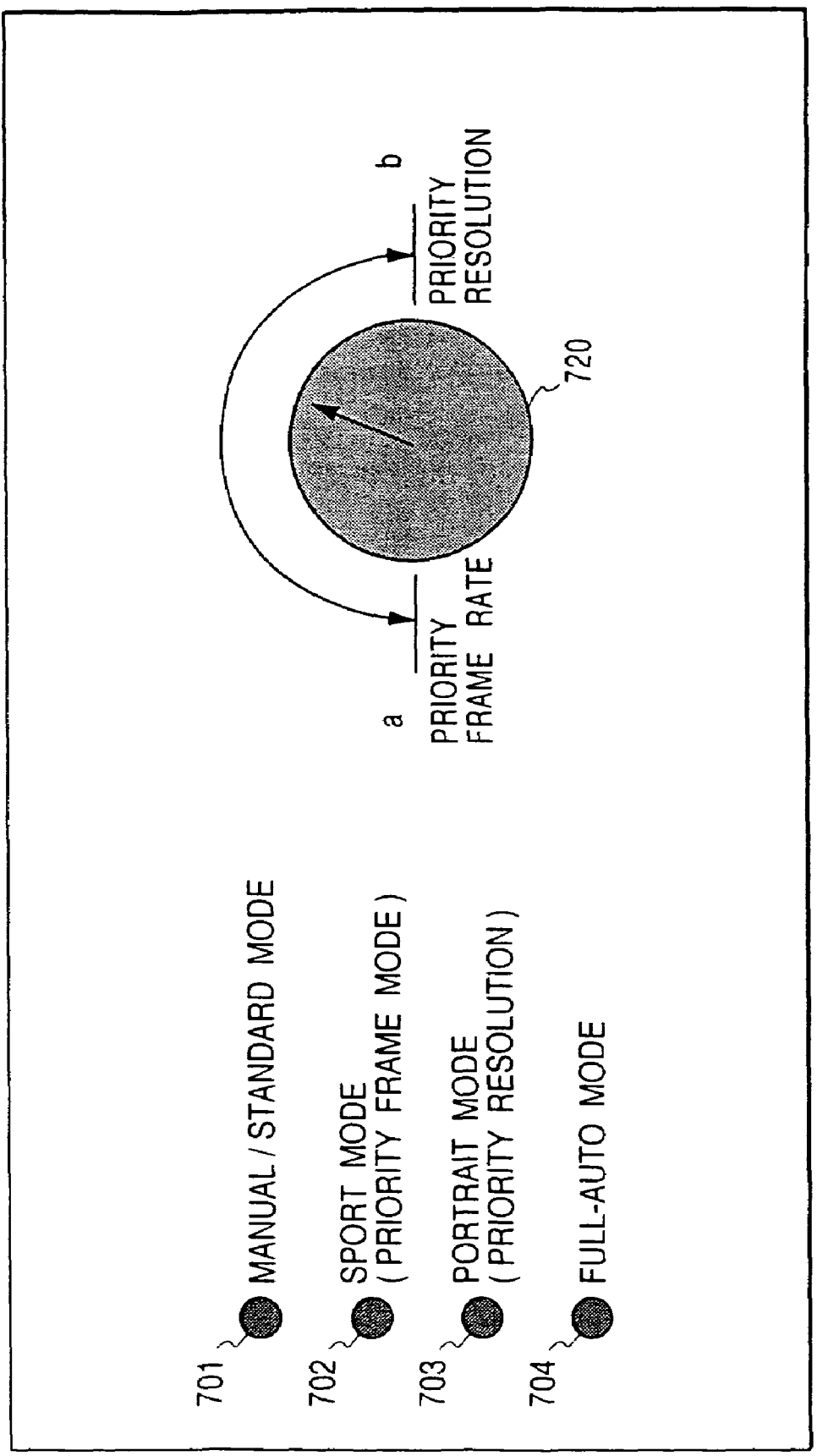
FIG. 12 shows another embodiment of a transmission method of image data in the operation switch 113 and the operation switch for the image pickup/transmission mode selection of the transmission image quality.

For example, another example is shown in FIG. 12. The operation switch of FIG. 12 uses one rotary switch 720 as a switch to set in the manual mode.

When the rotary switch 720 is rotated to a position a, the preference is set to the frame rate, and when it is rotated to a position b, the preference is set to the resolution.

As the rotary switch 720 is operated, the control circuit 106 controls the pixel thinning-out circuit 151, the frame rate thinning-out circuit 153 and the quantization step control circuit 156.

In other words, the foregoing description of the embodiments has been given for illustrative purposes only and is not to be construed as imposing any limitation in every respect.

The scope of the invention is, therefore, to be determined solely by the following claims and is not limited by the text of the specification, and alterations made within a scope equivalent to the scope of the claims fall within the true spirit and scope of the invention.

What is claimed is:

1. An image capture apparatus comprising:
    an image capture unit that captures images;
    a mode setting unit adapted to set one of a plurality of image capture modes in accordance with a selection by a user before said image capture unit captures the images;
    a control unit that determines, according to the image capture mode set by said mode setting unit, three parameters to be applied to the captured images, the three parameters including a frame rate, the number of pixels, and a compression ratio;

a wireless transmitting unit that transmits the captured images by wireless after the three parameters determined by said control unit are applied to the captured images; and a display unit that displays the three parameters determined by said control unit.

2. An apparatus according to claim 1, further comprising:

a recording unit that records the captured images on a recording medium.

3. A method of controlling an image capture apparatus, the method comprising the steps of:

capturing images;

setting one of a plurality of image capture modes in accordance with a selection by a user before the images are captured;

determining, according to the image capture mode set in said setting step, three parameters to be applied to the captured images, the three parameters including a frame rate, the number of pixels, and a compression ratio;

transmitting the captured images by wireless after the three parameters determined in said determining step are applied to the captured images; and displaying the three parameters determined in said determining step on a display unit of the image capture apparatus.

4. A method according to claim 3, further comprising the step of:

recording the captured images on a recording medium.

* * * * *

UNITED STATES PATENT AND TRADEMARK OFFICE
CERTIFICATE OF CORRECTION

| | | |
|---|---|---|
| PATENT NO. | : 7,386,174 B2 | Page 1 of 1 |
| APPLICATION NO. | : 10/645672 | |
| DATED | : June 10, 2008 | |
| INVENTOR(S) | : Kazuhiro Takahashi et al. | |

It is certified that error appears in the above-identified patent and that said Letters Patent is hereby corrected as shown below:

IN THE DRAWINGS:
Sheet 1, Fig. 1, Item 109, "RECOEDING" should read --RECORDING--.

Signed and Sealed this

Second Day of December, 2008

JON W. DUDAS
*Director of the United States Patent and Trademark Office*